(12) United States Patent
Simon et al.

(10) Patent No.: US 6,300,413 B1
(45) Date of Patent: Oct. 9, 2001

(54) CROSSLINKING BASE LAYER FOR BONDABLE INTERLININGS IN ACCORDANCE WITH THE DOUBLE DOT TECH TECHNIQUE

(75) Inventors: Ulrich Simon, Herne; Thorsten Gurke, Haltern; Hans-Willi Losensky, Marl, all of (DE)

(73) Assignee: Degussa-Huels Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/260,736

(22) Filed: Mar. 3, 1999

(30) Foreign Application Priority Data

Mar. 3, 1998 (DE) .............................................. 198 08 809

(51) Int. Cl.$^7$ ....................................................... C08F 8/00
(52) U.S. Cl. ............................ 525/131; 525/177; 525/184
(58) Field of Search ..................................... 525/131, 177, 525/184

(56) References Cited

U.S. PATENT DOCUMENTS

| | | | | |
|---|---|---|---|---|
| 4,383,084 | * | 5/1983 | Paschke et al. | 525/184 |
| 4,780,358 | * | 10/1988 | Ito et al. | 525/184 |
| 5,137,973 | * | 8/1992 | Khanna et al. | 525/177 |
| 5,231,137 | * | 7/1993 | Fisher et al. | 525/176 |
| 5,672,677 | * | 9/1997 | Morganelli et al. | 525/184 |

* cited by examiner

Primary Examiner—Bernard Lipman
(74) Attorney, Agent, or Firm—Oblon, Spivak, McClelland, Maier & Neustadt, P.C.

(57) ABSTRACT

A crosslinkable hot-melt adhesive composition, comprising a reactive powder mixed with a crosslinking component of a crosslinking agent bound in a polyolefin matrix, wherewith the components of the composition do not react by crosslinking until the mixture is melted, said composition being useful for the coating and/or lamination of sheet-like structures.

3 Claims, No Drawings

CROSSLINKING BASE LAYER FOR BONDABLE INTERLININGS IN ACCORDANCE WITH THE DOUBLE DOT TECH TECHNIQUE

BACKGROUND OF THE INVENTION

1. Field of the Invention

The present invention relates to a crosslinkable hot-melt adhesive coating based on a powder mixture comprising a commercially customary, amine-terminated copolyamide or copolyester and a pulverized extrudate consisting of an atactic polyolefin and a pulverulent isocyanate or an epoxide, for producing a base dot as a barrier to strikeback in double dot coating. The upper dot consists of an amine- or acid-regulated copolyamide, in order to ensure good attachment to the lower dot. The invention relates in particular to a hot-melt adhesive composition for the dot coating of bondable interlinings for the clothing industry, especially outerwear, and technical laminates. Instead of the copolyamide, it is also possible to employ HO-terminated copolyesters.

2. Description of the Background

In order to solve the problems regarding the reduced resistance to laundering and dry cleaning and regarding the relatively weak adhesion, improved hot-melt adhesive compositions, but also improved coating technologies, have been developed. Duodot or double dot coatings are described, for example, in patents DE 22 14 236, DE 22 31 723, DE 25 36 911 and DE 32 30 579.

Coating supports have been improved by using finer yarns with low-denier individual fibers down to the microfiber range and also synthetic yarns, examples being high-bulk acrylic or polyester yarns. The wovens originally used have largely been replaced by stitch-bonded fabrics. These new combinations lead to very soft, but also very open constructions which place even greater requirements on the coating methods and hot-melt adhesive compositions, especially with regard to strikeback and strikethrough of the hot-melt adhesive composition.

Costs and quality reasons have led to a marked reduction in the amount of coating applied per $m^2$ on interlining material. Whereas formerly the amounts applied were commonly 18–25 $g/m^2$, they are nowadays 7–15 $g/m^2$.

Despite these small amounts, it is necessary to ensure sufficient adhesion and resistance properties for the hot-melt composition; in other words, the hot-melt adhesive must not strike away into the interlining, since then it would no longer be available for the actual bonding.

An object that had developed in the art was to find an effective strikeback barrier which exhibits high bond strength, good attachment of the upper dot to the base layer and good resistance to laundering and dry cleaning at reduced amounts of coating of the adhesive.

A range of strikeback barriers is known which are (i) crosslinking acrylate dispersions or polyurethane dispersions, to (ii) powder-filled pastes based on high-melting copolyamides or polyethylene to (iii) highly viscous thermoplastic polyurethane powders.

All systems have more or less severe disadvantages in terms of application, the attachment to the upper dot and/or resistance to laundering. In addition, the dispersions cannot be employed on coarse, hairy interlinings.

When self-crosslinking acrylate or polyurethane dispersions are coated on a fabric, partial crosslinking occurs, even in the course of coating, which leads to a deposit on the screens and thus to clogging of the stencil holes. Laborious cleaning of the unit is required. Great difficulties are experienced when there is production-induced standstill. A further problem is the attachment of the upper dot to the base layer. The highly viscous powder-filled systems based on polyamide, polyethylene and polyurethane do not achieve the required strikeback reliability.

It has so far not been possible to provide a stable crosslinkable system for the base dot. Either the isocyanates, which are employed preferably, can not be stabilized to water (the matrix for coating pastes), or the activation temperature for crosslinking (greater than 160° C.) is too high.

SUMMARY OF THE INVENTION

Accordingly, one object of the present invention is to provide a crosslinkable hot-melt composition which exhibits improved adhesivity and improved laundering resistance.

Briefly, this object and other objects of the present invention as hereinafter will become more readily apparent can be attained by a crosslinkable hot-melt composition comprising:

a reactive powder mixed with a crosslinking component of a crosslinking agent bound in a polyolefin matrix, wherewith the components of the composition do not react by crosslinking until the mixture is melted, said composition being useful for the coating and/or lamination of sheet-like structures.

DETAILED DESCRIPTION OF THE PREFERRED EMBODIMENTS

It has now surprisingly become possible to prepare a very reactive system having an activation temperature in the range from about 100–130° C., which is also water resistant. The crosslinkable hot-melt adhesive composition of the invention for the coating and/or lamination of sheetlike structures has the feature that the reactive components present in the hot-melt adhesive composition do not react, with crosslinking, until in the melt. In this case, the crosslinking component is incorporated by extrusion into a polyolefin in the melt.

In a preferred embodiment, a commercially customary copolyamide having terminal amine groups is mixed with a trimerized diisocyanate which has been passivated by extrusion with an atactic polyolefin, and the mixture is processed as an aqueous paste by rotary screen printing. Instead of the copolyamide, it is also possible to employ a copolyester. In the course of subsequent drying in the oven at about 120° C., crosslinking is initiated within a few seconds to give a crosslinked strikeback barrier for the double dot. In this way it is possible to avoid the customary problems of isocyanate-containing systems, which are, for example, that capped isocyanates (with caprolactam or oximes as capping agent or obtained by dimerization) require excessive activation temperatures. Furthermore, no extraneous substances should be released in the course of bonding. The other problem has been that unblocked isocyanates react with water while still in the paste.

The isocyanate had to be stabilized against water, and against diffusion of atmospheric moisture, in order to ensure its activatability at relatively low temperatures. This has surprisingly been possible by binding the isocyanate into a polyolefin polymer, preferably atactic polypropylene, by extrusion, said polymer not absorbing any water by diffusion and having a melting point of about 120° C. and being of such low viscosity that it is possible on pressing to obtain a reaction of the amine-regulated copolyamide with the isocyanate Suitable isocyanates are solid isocyanates having more than two free NCO groups and a melting range from 100–130° C. The polymer of the matrix must not react with the isocyanate. Other suitable crosslinking components are epoxides having a melting range from 90–130° C., preferably from 100–120° C., a molecular weight range from 2000–6000, preferably from 2500–3000, and more than two epoxide groups per molecule; an example which may be mentioned is bisphenol A.

As the polymer matrix it is preferred to employ atactic polypropylene. It should have a melt viscosity of from 8000–50,000 mPas at 190° C. and a softening range from 80–150° C., preferably a melt viscosity of from 8000–30,000 mPas at 190° C. and a softening range from 100–140° C. Examples of suitable commercial products are VESTOPLAST 408, 308, 508, 520, 703, 704, 708 and 750 from Huels AG. The polyolefin can also be an atactic α-olefin copolymer or a terpolymer based on ethene, propene and 1-butene and having the characteristics described above. In order to achieve particularly good attachment of the upper dot to the base dot, it is advisable to employ an amine-regulated copolyamide as the upper dot material. Suitable products for the base dot and upper dot are low-melting grades of low viscosity. The melting point should range from 90–150° C., preferably from 115–130° C., with a solution viscosity eta rel in the range from 1.2–1.7, preferably from 1.25–1.4. By this means, the boundary layer reacts with the isocyanate paste and creates a highly stable bonding of the two dots. The coating amounts for the base dot should be from 2–5 g/m$^2$, preferably from 2.5–4 g/m$^2$, and for the upper dot, depending on application, should be from 4–8 g/m$^2$, especially from 5–7 g/m$^2$. Instead of the copolyamide, it is also possible to employ OH-terminated copolyesters based on terephthalic acid, isophthalic acid and butanediol, or butanediol in combination with small amounts of other diols, such as hexanediol or polyethylene glycol, for example, with melting points from 100–150° C.

The base dot can be applied as a paste in a dot formation. Similarly, the reactive powder mixture can be applied by a scattering process.

EXAMPLES

33% by weight of VESTANAT T 1890 were mixed homogeneously in an extruder at 125° C. with 66.6% by weight of VESTOPLAST 408 and the mixture was granulated, subjected to cold grinding and classified on a 50 μm screen.

25% by weight of the above-described powder were mixed with 75% by weight of VESTAMELT X 1027-P1 in a high-speed mixer.

This powder mixture was processed to a printable paste using common dispersants and thickeners, e.g. INTRASOL 12/18/5 and MIROX TX, from Stockhausen, as described in DE 20 07 971, DE 22 29 308, DE 24 07 505 and DE 25 07 504, and the paste was printed with a rotary screen printing unit having a CP 66 screen onto a 35 g polyester knit comprising high-bulk yarn. The amount applied was 2 g/m$^2$. VESTAMELT X 1027-P816 was scattered onto the still wet paste dot, the excess was removed by suction, and the material was dried and partially sintered in a drying oven at 130° C. The upper dot comprised an add-on of 5 g/m$^2$, so that the overall weight was 7 g/m$^2$.

Paste Formulation for the Base Dot
  1500 g of water
  35 g of MIROX TX (polyacrylic acid derivative)
  40 g of INTRASOL 12/18/5 (ethoxylated fatty alcohol)
  600 g of a reactive powder mixture of VESTOPLAST 408 and VESTANAT T 1890
Result
  A 5 cm wide strip of this interlining was bonded to a siliconized shirt material comprising a polyester/cotton blend at a joining temperature of 127° C. and a linear pressure of 4 N for 10 s, and then the assembly was subjected to washing at 60° C.
  Primary adhesion: 16 N/5 cm
  60° C. wash: 12 N/ 5 cm
  Back-riveting: 0.1 N/10 cm

Comparative Example

A paste system based on polyamide/polyethylene was applied to the same interlining and the material was scattered with the same upper dot material, dried and sintered. The same amounts of base dot and upper dot were applied.
Paste Formulation
  1500 g of water
  35 g of MIROX TX
  40 g of INTRASOL 12/18/5
  400 g of SCHÄTTIFIX 1820 (LD polyethylene)
  200 g of VESTAMELT 751-P1
  SCHÄTTIFIX 1820 is a low-pressure polyethylene having a melting point of 128–130° C. and an MFR of 20 g/10 min
Result
  Primary adhesion: 9 N/5 cm
  60° C. wash: 5 N/5 cm
  Back-riveting: 0.9 N/10 cm
  The advantage of the new technology is that the lower dot is crosslinked even under the drying conditions and, owing to its amine termination, the upper dot is crosslinked with the lower dot during melting, so giving an optimum attachment. Since there is a sharp increase in the molecular weight of the lower dot following coating, it is no longer able to sink into the knit. In the course of subsequent bonding, the low-viscosity polyamide of the upper dot is compelled to flow against the upper material that is to be bonded, since it is unable to flow off downward, hence giving very high adhesions even with very small amounts of hotmelt adhesive. The parting layer between upper dot and base dot, which hitherto has been the weak point of the system, especially in the course of laundering, is more resistant to hydrolytic attack than prior systems and, therefore, exhibits considerably higher stability.
Products Employed
  VESTAMELT X 1027-P1 is a ternary copolyamide from Huels AG based on LL, CL and DDS/MPD with amine end groups, melting point 120° C., amine end groups 100–400 meq/kg, preferably 250–350 meq/kg.
  VESTOPLAST 408-P1 is an atactic μ-olefin co-terpolymer from Huels AG with a softening point of 118° C. and a melt viscosity at 190° C. of 8000 mPas.
  VESTANAT T 1890/100 is a polyisocyanate having a functionality of 3–4, its melting point being at 100–115° C. It is a product of Huels AG.

The disclosure of priority German Application No. 19808809.4 filed Mar. 3, 1998 is hereby incorporated by reference into the present application.

Obviously, numerous modifications and variations of the present invention are possible in light of the above teachings. It is, therefore, to be understood that within the scope of the appended claims, the invention may be practiced otherwise than as specifically described herein.

What is claimed is:

1. A crosslinkable hot-melt adhesive composition, comprising:

a reactive powder of powdered copolyamide or copolyester mixed with a crosslinking component of an isocyanate crosslinking agent bound in a polyolefin matrix, wherewith the components of the composition do not react by crosslinking until the mixture is melted, said composition being useful for the coating and/or lamination of sheet-like structures.

2. The hot-melt composition according to claim 1, wherein the crosslinking agent is an isocyanate which has more than two reactive groups per molecule and has a melting range of from 100–130° C.

3. A cross-linkable hot-melt adhesive composition, comprising:

a reactive powder of a thermoplastic copolyamide mixed with a cross-linking component of trimerized isophorone bound in an ethylene/propylene/1-butene terpolymer matrix, wherewith the components of the composition do not react by cross-linking until the mixture is melted, said composition being useful for the coating and/or lamination of sheet-like structures.

* * * * *